United States Patent [19]
Peetoom

[11] Patent Number: 5,969,487
[45] Date of Patent: Oct. 19, 1999

[54] DEFLECTION CIRCUIT WITH DAMPING IMPEDANCE AND CURRENT COMPENSATION

[75] Inventor: Johannes A. Peetoom, Nijmegen, Netherlands

[73] Assignee: U.S. Philips Corporation, New York, N.Y.

[21] Appl. No.: 08/941,642

[22] Filed: Sep. 30, 1997

[30] Foreign Application Priority Data

Oct. 14, 1996 [EP] European Pat. Off. .............. 96202856

[51] Int. Cl.$^6$ ............................ H04N 3/233; H04N 3/23; H01J 29/70; G09G 1/04
[52] U.S. Cl. .......................... 315/387; 315/370; 315/389; 315/399; 315/403; 315/408; 348/806
[58] Field of Search ..................................... 315/387, 389, 315/403, 370, 404, 408, 399; 348/806

[56] References Cited

U.S. PATENT DOCUMENTS

| | | | |
|---|---|---|---|
| 3,646,393 | 2/1972 | Tarr | 315/27 |
| 4,603,282 | 7/1986 | Close | 315/403 |
| 4,645,987 | 2/1987 | Kiteley et al. | 315/389 |
| 4,677,352 | 6/1987 | Sibovits et al. | 315/408 |
| 4,686,432 | 8/1987 | Berland et al. | 315/403 |
| 4,752,722 | 6/1988 | Erratico et al. | 315/403 |
| 4,755,727 | 7/1988 | Ponte | 315/389 |
| 4,931,703 | 6/1990 | Ogino | 315/370 |
| 4,988,927 | 1/1991 | Spruck | 315/371 |
| 5,008,600 | 4/1991 | Hashimoto et al. | 315/370 |
| 5,369,341 | 11/1994 | Wilber | 315/389 |
| 5,473,223 | 12/1995 | Murakami | 315/367 |
| 5,789,874 | 8/1998 | Kataoka | 315/395 |

OTHER PUBLICATIONS

Philips Semiconductors Application Note AN95029, TDA 8350 and TDA 8351 deflection output circuits by Dick v.d. Brul and Pierre Duijkers, Apr. 1, 1995, pp. 1–43.

*Primary Examiner*—Edward P. Westin
*Assistant Examiner*—Shane R. Gardner
*Attorney, Agent, or Firm*—Edward W. Goodman

[57] ABSTRACT

A deflection circuit generates a deflection current (If) through a deflection coil (Lf). The deflection circuit includes a series resistor (Rs) arranged in series with the deflection coil (Lf) to supply a feedback voltage (Vf;Vr), and a drive circuit (1,5) which has an output coupled to the series arrangement of the deflection coil (Lf) and the series resistor (Rs). The drive circuit (1,5) has an input coupled to the series resistor (Rs) to receive a feedback voltage (Vs). The drive circuit (1,5) further is coupled to a conversion resistor (Rc) for receiving an input waveform (Vi). The drive circuit (1,5) is arranged in a feedback loop to obtain a deflection current (If) with a shape resembling the input waveform (Vi). The deflection circuit further includes a damping impedance (Rd) arranged in parallel with the deflection coil (Lf), and a current generating circuit (3) for generating a correction current (Ic) within the flyback period (Tf). The current generating circuit (3) is coupled to the conversion resistor (Rc) and/or the series resistor (Rs), and is activated during at least a last part of the flyback period (Tf). In this way, the correction current (Ic) can easily be adapted with external components and does not suffer from tolerances in an integrated circuit.

14 Claims, 4 Drawing Sheets

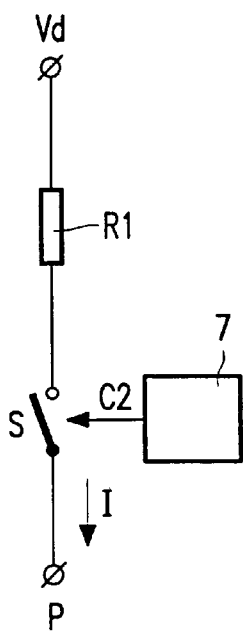
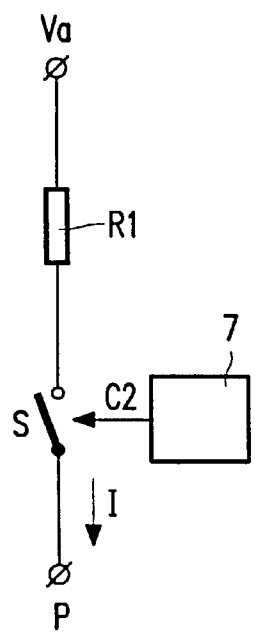
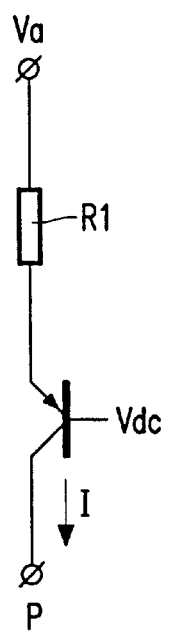
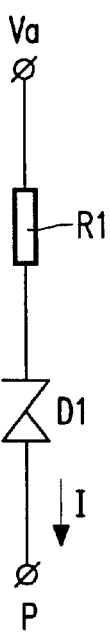
FIG. 5A   FIG. 5B   FIG. 5C   FIG. 5D
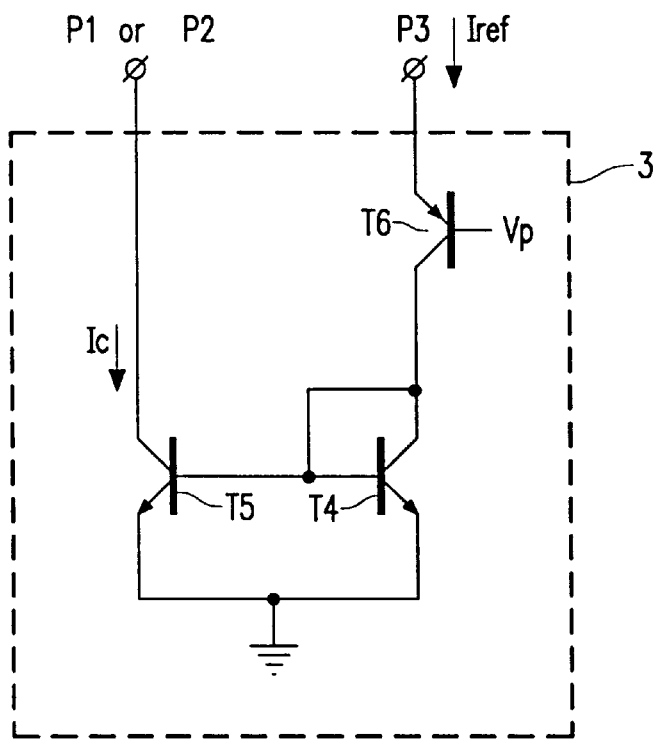
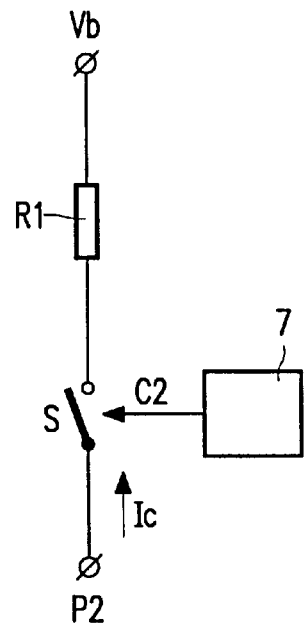
FIG. 5E   FIG. 5F

DEFLECTION CIRCUIT WITH DAMPING IMPEDANCE AND CURRENT COMPENSATION

BACKGROUND OF THE INVENTION

1. Field of the Invention

The invention relates to a deflection circuit for generating a deflection current through a deflection coil to deflect an electron beam in a cathode ray tube, the deflection current having a scan period and a flyback period, the deflection circuit comprising: a series resistor arranged in series with the deflection coil to generate a feedback voltage related to the deflection current, a damping impedance arranged in parallel with the deflection coil, a drive circuit having an input terminal coupled to the series resistor to receive the feedback voltage, the drive circuit further being coupled to a conversion resistor to receive an input waveform, and having an output coupled to the series arrangement of the deflection coil and the series resistor, the drive circuit generating the deflection current in response to a difference between the input waveform and the feedback voltage, and current generating means for generating a correction current within the flyback period.

The invention also relates to a picture display apparatus comprising such a deflection circuit, and to an integrated circuit for use in such a deflection circuit.

2. Description of the Related Art

The Philips Semiconductors Application Note AN95029 "TDA 8350 and TDA 8351 deflection output circuits Application information" discloses an integrated power circuit for use in a raster scan circuit. The integrated power circuit has a first and a second output amplifier which are arranged in a bridge configuration to generate a deflection current through a raster scan deflection coil. The deflection current generates a magnetic field for deflecting electron beams in a cathode ray tube in the vertical direction. A measurement resistor is arranged in series with the deflection coil. Across this measurement resistor, a voltage is generated which is related to the deflection current through the deflection coil. The voltage across the measurement resistor is sensed with a first voltage-to-current converter which has a first and a second current output. To provide a feedback, the first current output is connected to an input of the first output amplifier, and the second current output is connected to an input of the second output amplifier. The integrated power circuit further comprises a second voltage-to-current converter which has two inputs for receiving an input waveform occurring across an input resistor. The second voltage-to-current converter has a first and a second current output. The first current output is connected to the input of the first output amplifier, and the second current output is connected to the input of the second output amplifier. The first and the second voltage-to-current converters are identical. The current outputs of the first and the second voltage-to-current converters, which are interconnected, supply output currents which have opposite polarities. In this way, the output voltages of the output amplifiers will be controlled such that the voltages across the measurement resistor and the input resistor are substantially equal.

A damping resistor is arranged in parallel with the deflection coil for smoothening switching points of the currents and voltages which occur in the raster scan circuit, as well as to prevent ringing. However, this damping resistor deteriorates the flyback performance of the deflection circuit. Depending on the application, compressed lines, bright lines or flyback lines become visible.

SUMMARY OF THE INVENTION

It is an object of the invention to provide a deflection circuit which allows a satisfactory flyback performance in a wider range of applications.

A first aspect of the invention is characterized in that the current generating means is coupled to the series resistor and/or the conversion resistor, whereby the correction current is activated during at least a last part of the flyback period.

A second aspect of the invention provides a picture display apparatus comprising a deflection circuit as described above.

A third aspect of the invention provides an integrated circuit for use in a deflection circuit as described above.

The deflection circuit comprises a drive circuit which has an input for receiving an input waveform which is generated by a well-known synchronisation circuit. The drive circuit has an output for supplying the deflection current to the series arrangement of the deflection coil and the series resistor. A feedback voltage is generated across the series resistor due to the deflection current flowing through it. The voltage supplied by the output of the drive circuit is adjusted, in one of many known ways, such that the feedback voltage equals the reference waveform. As, during the scan period, the deflection coil may be regarded as a resistor, a relatively small scan supply voltage suffices to generate the deflection current during the scan period. During the relatively short flyback period, a quick reversal of the deflection current polarity has to be obtained. For such quick current changes, the deflection coil has to be regarded as an inductance and, therefore, a high flyback supply voltage is needed to obtain a short flyback period. During the scan period, the output voltage of the drive circuit is generated from a relative low scan supply voltage to minimize dissipation. During the flyback period, a high flyback supply voltage is connected to the output of the drive circuit. The drive circuit may comprise a differential input stage which has inputs being the inputs of the drive circuit, and an output stage receiving an input current from the differential input stage depending on the difference of the input voltage and the feedback voltage. The output stage is a power stage able to supply the deflection current. In this case, the flyback supply voltage is connected to the output of the drive circuit which is the output of the output amplifier if the current supplied at the input of the output amplifier increases above a certain level. The flyback voltage will be disconnected as soon as the current supplied to the input of the output amplifier decreases below the certain level.

The invention is based on the insight that the deteriorated flyback performance is caused by the fact that the current through the damping resistor is larger during the flyback period than during the scan period. The effect of the current through the damping impedance will be elucidated in the following. Not only the current through the deflection coil, but also the current through the damping impedance, which is arranged in parallel with the deflection coil, flows through the series resistor. So, the voltage across the series resistor depends on the sum of the current flowing through the deflection coil and the current flowing through the damping impedance.

At the start of a scan period, approximately a scan supply voltage occurs across the deflection coil. The current through the damping impedance depends on the value of this scan supply voltage. If no damping impedance were present, the current through the series resistor would be equal to the current through the deflection coil. The voltage across the series resistor is controlled to be equal to the input voltage. So, due to the current through the series resistor caused by the damping impedance, the current through the deflection coil will be lower than would be the case without the damping impedance.

During the flyback period, a flyback supply voltage occurs across the deflection coil. This flyback supply voltage has a larger value than the scan supply voltage to be able to change the polarity of the deflection current in the short flyback period. Thus, the current through the damping impedance is larger during the flyback period than during the scan period. At a same feedback voltage across the series resistor as occurring during the end of the flyback period and the start of the scan period, this causes the current through the deflection coil to be lower during the flyback period than at the start of the scan period. The flyback supply voltage will be disconnected from the deflection coil at the moment the input current of the output amplifier decreases below a certain value. This decoupling of the flyback supply voltage is needed to avoid a high dissipation during the scan period during which a lower scan supply voltage suffices. Due to the high extra current through the measuring resistor caused by the high voltage across the damping impedance, the decoupling of the flyback supply voltage is activated at a relatively low value of the deflection current. So, the value of the deflection current through the deflection coil at the end of the flyback period is lower than the amount of the deflection current desired at the start of the scan. Before starting a next scan, the too low amount of deflection current at the end of the flyback period has to increase to the higher amount of deflection current as desired at the start of the scan. This transition has to be performed with the low scan supply voltage and thus will take substantially more time than would be the case if the flyback can be wholly performed with the higher flyback supply voltage.

The known frame deflection output circuit has an internal compensation for the effect of the current through the damping resistor by adapting a bias current through a differential input stage which measures the voltage across the series resistor. The bias current is enlarged with a fixed amount during the flyback period. As the flyback voltage will be disconnected as soon as the current supplied to the input of the first output amplifier decreases below the certain level, the higher input current causes the period in which the flyback voltage is connected to become longer. The known frame deflection circuit has the drawback that the compensation is optimal only for one combination of the impedance of the deflection coil, the value of the damping resistor, the value of the flyback voltage, and the value of the scan voltage. Further, due to tolerances in the integrated circuit design, the fixed amount with which the bias current is adapted also shows tolerances. The foregoing has the drawback that a longer flyback period or a higher flyback supply voltage has to be chosen. However, a longer flyback period makes the deflection circuit unsuitable for applications requiring a short flyback period. Further, the flyback voltage is limited by the process in which the integrated circuit has been diffused and thus cannot be enlarged above the process limit. Both these facts disable the use of the integrated power circuit in applications in which a satisfactory flyback performance is required at high deflection frequencies and wherein the detrimental effect of the damping impedance is not optimally compensated. This kind of applications which have to cope with high deflection frequencies, such as 100 Hz applications, or multimedia applications suitable to display computer display graphics, become more and more important. In these applications, the scan voltage stays in the usual range as the resistance of the deflection coil and not the inductance is relevant during the scan period. However, during the short flyback period, a high flyback supply voltage is needed as the deflection coil behaves as an inductance. At such a high flyback supply voltage, the difference between the flyback supply voltage and the scan supply voltage is much larger than usual. Therefore, in these applications, the influence of the damping impedance on the deterioration of the flyback behavior is large. At the maximum permissible flyback voltage of the integrated circuit, the shortest possible flyback time is reached with a satisfactory flyback performance by optimally compensating for the influence of the damping impedance. Without an optimal compensation, a distance between scan lines at the start of the scan will be too small (top fold over due to too less compensation), or the distance between scan lines is too large (line spacing due to too much compensation).

The invention reaches an optimal compensation of the influence of the damping impedance by coupling the current generating circuit to the series resistor or the conversion resistor to generate a correction current during at least the last part of the flyback period to compensate for the current through the damping impedance. If the current generating circuit is coupled to the series resistor, the correction current is diverted from the series resistor to prevent the current through the damping impedance to flow through the series resistor.

If the current generating circuit is coupled to the conversion resistor, the correction current is supplied to the conversion resistor to enlarge the current through the conversion resistor. Now, the current through the series resistor is allowed to reach a higher value before the flyback supply voltage will be disconnected, thereby preventing a disconnection of the flyback supply voltage at a too low value of the deflection current.

Due to the fact that the current generating circuit is coupled to the series resistor or the conversion resistor which are not within the integrated circuit, it is easy to provide a current determining element outside the integrated circuit, so that the amount of correction current generated by the current generating circuit can easily be adapted to fit the demand as determined by the values of the impedances of the deflection coil and the damping impedance thereby enabling an optimal compensation of the current through the damping impedance. So, the deflection circuit according to the invention can be used in applications in which the deflection circuit with the known compensation was not able to reach a satisfactory flyback performance for short flyback times.

The prior art provides a fixed compensation of the influence of the damping impedance by delaying the moment of the disconnecting of the flyback supply voltage. The prior art does not divert a current flowing through the damping impedance from the series resistor during the flyback period to prevent the current through the damping impedance to influence the value of the deflection current. The prior art also does not supply an extra current through the conversion resistor during the flyback period to compensate for the extra current flowing through the series resistor due to the current through the damping impedance.

Further, the prior art does not take into account that the current through the damping impedance depends on the value of the flyback supply voltage. The value of the flyback voltage is determined by the impedance of the deflection coil, and varies due to tolerances or aging.

In an embodiment of the invention, the correction current depends on the value of the flyback voltage as the current determining resistor is coupled between a DC-voltage and a deflection voltage containing the flyback supply voltage.

In another embodiment of the invention, a simple way of generating the correction current is employed. These embodiments have the advantage that the semiconductor switch is conductive during the flyback period and non conducting during the scan period, automatically, without the need for a control circuit controlling the period of conduction of the switch.

In another embodiment of the invention, the current generating circuit is coupled in parallel to the series resistor. During at least the last part of the flyback period, the correction current is diverted at least partly from the series resistor to lower the amount of the current flowing through the series resistor due to the damping impedance.

BRIEF DESCRIPTION OF THE DRAWINGS

These and other aspects of the invention will be described and elucidated with reference to the accompanying drawings.

In the drawings:

FIGS. 5A–5F show circuit diagrams of embodiments of current generating circuits according to the invention.

DESCRIPTION OF THE PREFERRED EMBODIMENTS

Figure 1:
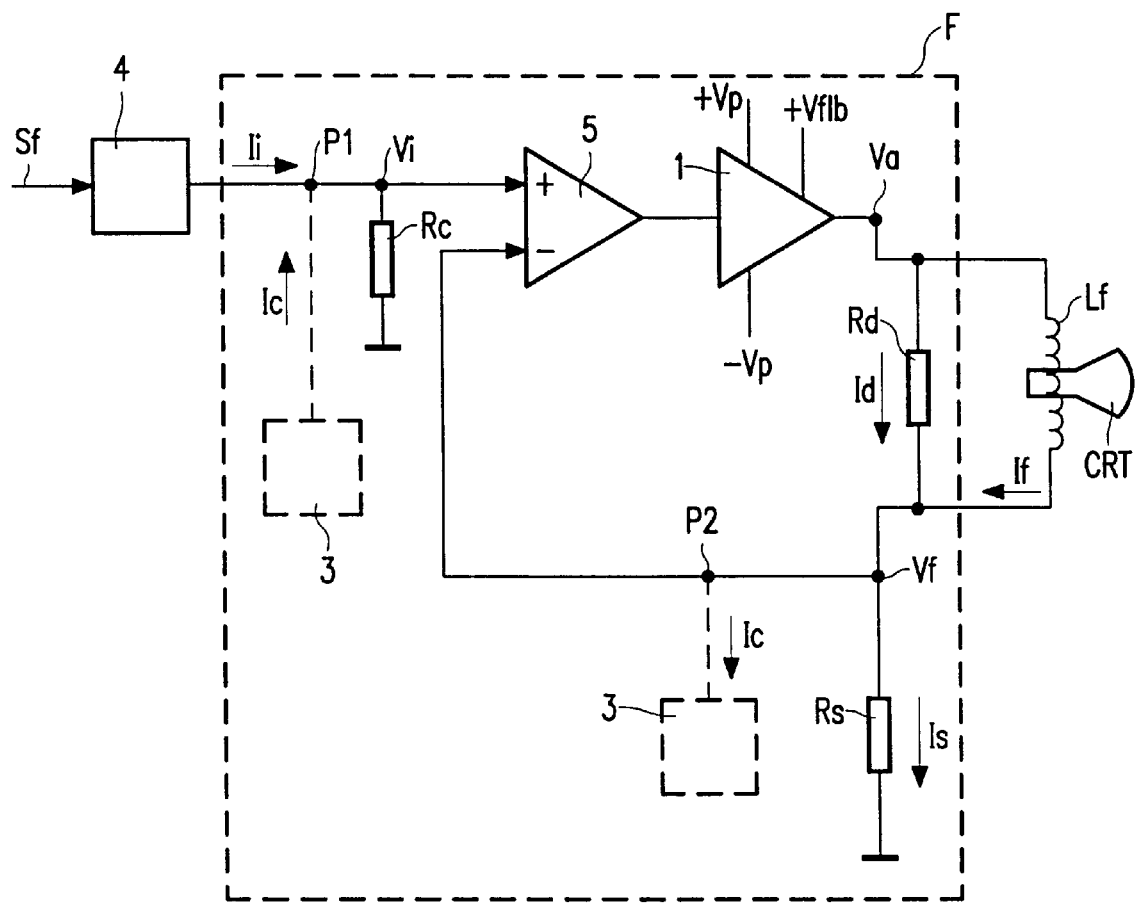
FIG. 1 shows a frame deflection circuit with a current generating circuit according to the invention.

FIG. 1 shows a frame deflection circuit F with a current generating circuit 3 according to the invention. A reference waveform is applied to an input of the frame deflection circuit F as an input current Ii. The reference waveform is generated by a synchronization circuit 4 in response to a frame synchronization signal Sf. The frame deflection circuit F comprises a drive circuit 5, an output amplifier 1, a damping resistor Rd, a series resistor Rs, and a current generating circuit 3. The current generating circuit 3 may be present on each or both of the two positions shown in dashed lines. The drive circuit 5 is constituted as a differential amplifier 5. A conversion resistor Rc is connected to a non-inverting input of the differential amplifier 5. The input current Ii causes an input voltage Vi across the conversion resistor Rc. The connection point of the non-inverting input of the differential amplifier 5 and the conversion resistor Rc is denoted as a first connection point P1. The differential amplifier 5 has an inverting input connected to a first end of the series resistor Rs, and an output connected to an input of the output amplifier 1. The output amplifier 1 has an output which supplies an output voltage Va, and supply terminals to receive a positive scan supply voltage +Vp, a negative scan supply voltage –Vp, and a flyback supply voltage Vflb. A parallel arrangement of the deflection coil Lf and the damping resistor Rd is connected between the output of the output amplifier 1 and the first terminal of the series resistor Rs. The other terminal of the series resistor Rs is connected to ground potential. The connection point of the damping resistor Rd and the series resistor Rs is denoted as the second connection point P2. The current generating circuit 3 may be connected to the second connection point P2 to divert at least part of the current Id through the damping resistor Rd from the series resistor Rs, during at least the last part of the flyback period Tf. The current generating circuit 3 may instead or also be connected to the first connection point P1 to enlarge the voltage Vi across the conversion resistor Rc during at least the last part of the flyback period Tf.

The deflection coil Lf generates a magnetic field for deflecting at least one electron beam in the cathode ray tube CRT. The frame deflection may be a deflection in the vertical direction if a picture is composed by subsequently scanning horizontal lines in the vertical direction, as is common practice. The frame deflection may be a deflection in horizontal direction if a picture is composed by subsequently scanning vertical lines in the horizontal direction, as is the case with the so called transposed scanning. The deflection circuit according to the invention can also be used to generate a line scan.

It is also possible to connect the conversion resistor Rc with a first end to the inverting input of the differential amplifier 5. A second end of the conversion resistor Rc receives the input current Ii. The non-inverting input of the differential amplifier 5 receives a DC-voltage. The current generating circuit 3 is connected to the second end of the conversion resistor Rc to supply the correction current Ic.

Figure 2A:
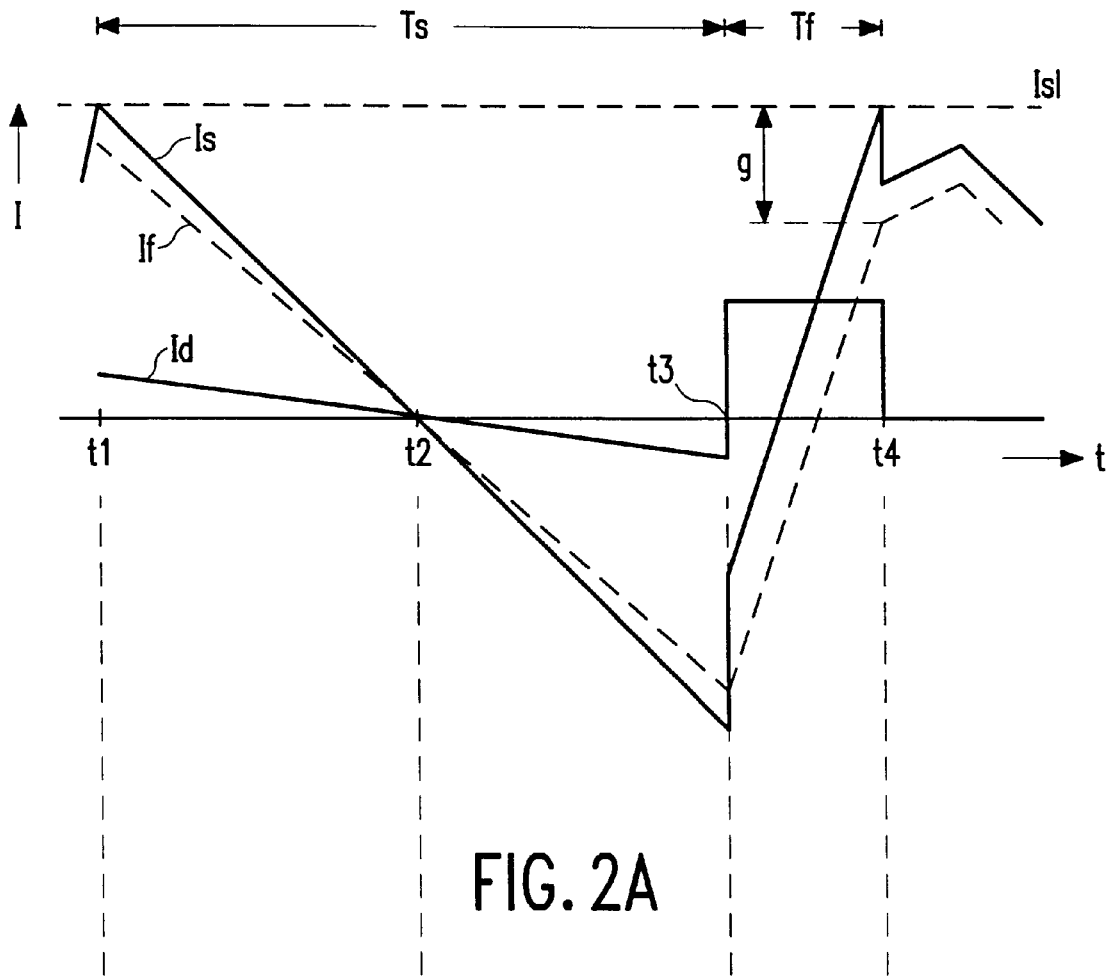
FIGS. 2A and 2B show waveforms for explaining the effect of a damping resistor.
Figure 2B:
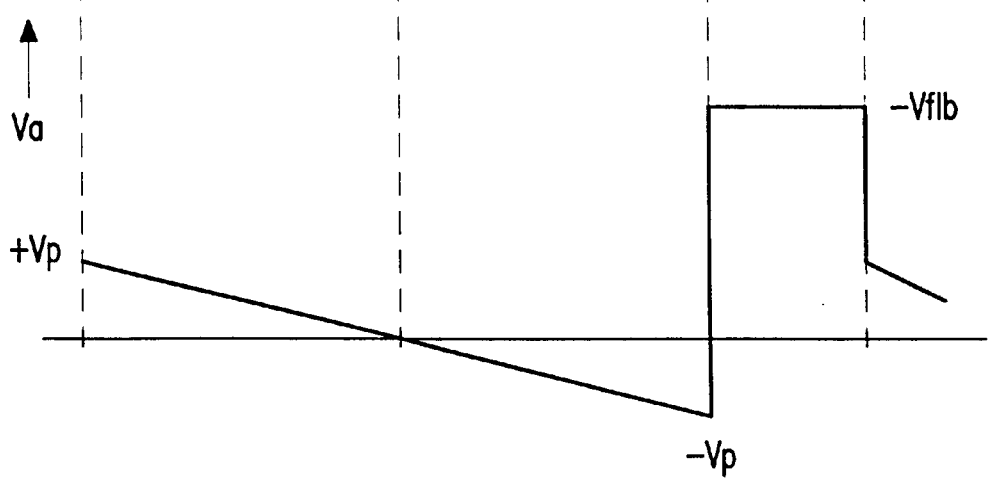

The operation of the frame deflection circuit F will be elucidated with respect to the waveforms shown in FIGS. 2A and 2B.

FIG. 2A shows waveforms of the current Is through the series resistor Rs, the deflection current If, and the current Id through the damping resistor Rd, respectively, all as a function of time. The deflection current If is represented by a dashed line. FIG. 2B shows the output voltage Va of the output amplifier 1. Especially during the flyback period, this is a simplified waveform. Moment t1 denotes the start of a scan period Ts. Moment t2 denotes the middle of the scan period Ts. Moment t3 denotes the end of the scan period Ts and the start of the flyback period Tf. Moment t4 denotes the end of the flyback period Tf and the start of a subsequent scan period Ts. For clarity, the duration of the flyback period Tf has been exaggerated.

During the scan period Ts, in a first approximation, the deflection coil Lf behaves as a resistor. So, the voltage across the deflection coil Lf should be substantially sawtooth shaped to obtain a substantial sawtooth shaped deflection current If through the deflection coil Lf. At the start t1 of a scan period Ts, the output voltage Va of the output amplifier 1 is, approximately, equal to the scan supply voltage Vp, and approximately a scan supply voltage Vp occurs across the deflection coil Lf. The scan supply voltage Vp is selected to be high enough to generate a desired maximum value of the deflection current If, and as low as possible to minimize the dissipation in the output amplifier 1. The value of this scan supply voltage Vp also determines the current Id through the damping impedance Rd during the scan period. The current Is through the series resistor Rs is composed out of the deflection current If through the deflection coil Lf and the current Id through the damping resistor Rd. The differential amplifier 5 compares the feedback voltage Vf across the series resistor Rs with the input voltage Vi and controls the output amplifier 1 to supply a value of the output voltage Va such that the feedback voltage Vf equals the input voltage Vi across the conversion resistor Rc as much as possible. Due to the fact that the feedback voltage Vf is also determined by the current Id through the damping resistor Rd, the actual deflection current If has a somewhat lower amplitude compared with the situation without a damping resistor Rd.

During the flyback period Tf, a flyback supply voltage Vflb occurs across the deflection coil Lf. During the flyback period Tf, in a first approximation, the deflection coil Lf acts as an inductance. This flyback supply voltage Vflb has a larger value than the scan supply voltage Vp to be able to change the polarity of the deflection current If within the short flyback period Tf. Thus, the current Id through the damping resistor Rd is larger during the flyback period Tf than during the scan period Ts. The flyback supply voltage Vflb will be disconnected from the deflection coil Lf at the moment an input current of the output amplifier 1 decreases below a certain value. It is possible to use information other than the input current to the output amplifier to control the connecting and disconnecting of the flyback supply voltage. As an example, the flyback supply voltage may be disconnected if the voltage Vf across the series resistor Rs reaches the flyback voltage level of the input voltage Vi. The flyback voltage level of the input voltage Vi may be the value at the start of the scan if the current generating circuit 3 is connected to the series resistor Rs. It is also possible to disconnect the flyback supply voltage at the moment that the output voltage Va of the output amplifier 1 rises above the positive scan supply voltage +Vp. In FIG. 2A, the level at which the flyback supply voltage is disconnected is denoted by Is1. Due to the high extra current through the series resistor Rs caused by the high voltage across the damping resistor Rd, the disconnecting of the flyback supply voltage Vflb is activated at a relatively low value of the deflection current If. So, the value of the deflection current If through the deflection coil Lf at the end t4 of the flyback period Tf is lower than the amount of the deflection current If as desired at the start t1, t4 of the scan period Ts. Before starting a next frame scan, the too low amount of deflection current If at the end t4 of the flyback period Tf has to increase to the higher amount of the deflection current If as desired at the start t4 of the scan period Ts. This transition has to be performed with the lower scan supply voltage Vp and thus will take substantially more time than is the case if the flyback can be wholly performed which the higher flyback supply voltage Vflb. To emphasize the influence of the damping resistor during the flyback period Tf, it is assumed that during the flyback period Tf before moment t1, no flyback supply voltage Vflb is available and that the flyback period Tf is long enough to obtain a desired amplitude of the deflection current If. This is in contrast to the flyback period Tf between the moments t3 and t4, during which a flyback supply voltage Vflb is connected to obtain a short flyback period Tf.

The frame deflection circuit F according to the invention solves this problem by coupling the current generating circuit 3 to the series resistor Rs and/or the conversion resistor Rc to generate a correction current Ic during at least the last part of the flyback period Tf to compensate for the current Id through the damping impedance Rd. If the current generating circuit 3 is connected to the series resistor Rs, the correction current Ic is diverted from the series resistor Rs to prevent the current Id, flowing through the damping impedance Rd, from flowing through the series resistor Rs. If the current generating circuit 3 is coupled to the conversion resistor Rc, the correction current Ic enlarges the input voltage Vi across the conversion resistor Rc. Now, the current through the series resistor Rs is allowed to reach a higher value before the flyback supply voltage Vflb will be disconnected, thereby preventing a disconnection of the flyback supply voltage Vflb at a too low value of the deflection current If.

Figure 3:
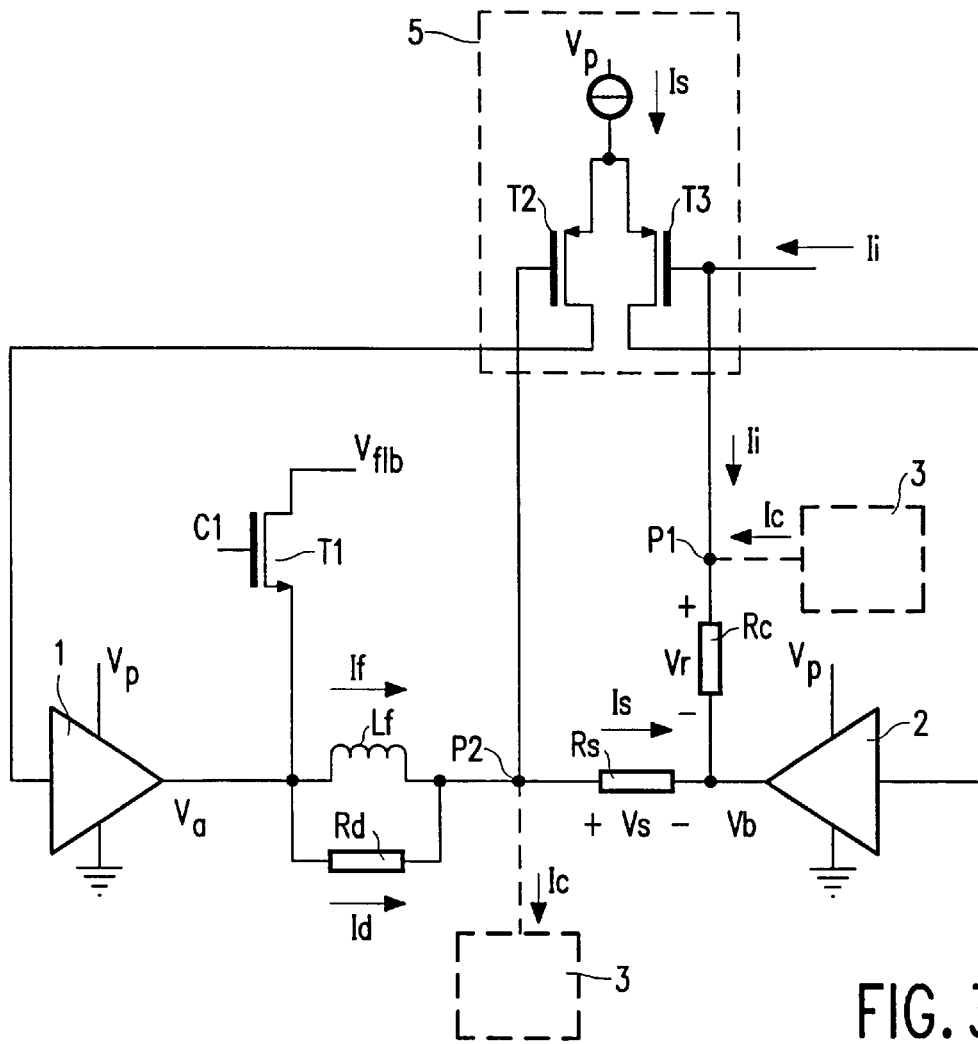
FIG. 3 shows another frame deflection circuit with the current generating circuit according to the invention.

FIG. 3 shows another frame deflection circuit with a current generating circuit 3 according to the invention. This frame deflection circuit comprises a first and a second output amplifier 1, 2 arranged in a bridge configuration. Each of the output amplifiers 1, 2 receives a scan supply voltage Vp. The first output amplifier 1 has an output which supplies a voltage Va, the second output amplifier 2 has an output which supplies a voltage Vb. A series arrangement of a deflection coil Lf and a series resistor Rs is connected between the output of the first output amplifier 1 and the output of the second output amplifier 2. The damping resistor Rd is arranged in parallel with the deflection coil Lf. A flyback supply voltage Vflb is applied via a field effect transistor Ti to the output of the first output amplifier 1. The field effect transistor Ti connects the flyback supply voltage Vflb to the deflection coil Lf during the flyback period Tf. The field effect transistor Ti may be integrated in the output amplifier. A drive circuit 5 is constituted by a differential amplifier 5 which comprises a first field effect transistor (further referred to as FET) T2, a second FET T3 and a current source Is. The source of the first FET T2 is connected to the source of the second FET T3 and to one end of the current source Is. The other end of the current source Is is connected to the scan supply voltage Vp. A gate of the first FET T2 is connected to a connection point of the deflection coil Lf and the series resistor Rs. This connection point is further referred to as second connection point P2. A gate of the second FET T3 is connected to the output of the second output amplifier 2 via a conversion resistor Rc, and receives the input current Ii. The gates of the first and second FET's T2, T3 constitute a first and second input of the differential amplifier 5. The connection point of the gate of the second FET T3 and the conversion resistor Rc is further referred to as connection point P1. A drain of the first FET T2 is connected to an input of the first output amplifier 1. A drain of the second FET T3 is connected to an input of the second output amplifier 2. The drains of the first and second FET's T2, T3 constitute outputs of the differential amplifier 5. The current generating circuit 3 is connected to the first or second connection point P1, P2.

This frame deflection circuit F operates as follows. The input current Ii causes a reference voltage Vr across the conversion resistor Rc. The current Is through the series resistor Rs causes a voltage Vs across the series resistor Rs. The differential amplifier 5 receives the sum of the voltage Vs and the reference voltage Vr between its inputs, and supplies currents at its outputs to drive the first and the second output amplifiers 1, 2 such that this sum is kept zero. In this way, the output amplifiers 1, 2 are controlled to supply the output voltages Va, Vb to obtain a voltage Vs across the series resistor Rs which is equal to the reference voltage Vr. In the same way as explained earlier, the current Id through the damping resistor Rd is larger at the end of the flyback period Tf than at the start of the scan period Ts as the value of the flyback supply voltage Vflb is larger than the value of the scan supply voltage Vp. If the current generating circuit 3 is connected to the first connection point P1, it generates the correction current Ic to add to the input current Ii to enlarge the reference voltage Vr during at least the last part of the flyback period Tf. If the current generating circuit 3 is connected to the second connection point P2, it diverts the correction current Ic from the series resistor Rs during the at least last part of the flyback period.

It is clear that the conversion resistor Rc may also be arranged between the first input of the differential amplifier 5 and the second connection point P2. Now, the input current Ii is supplied to the first input of the differential amplifier 5. In this case, the value of the conversion resistor Rc should be large enough to prevent the input current Ii which flows through it to disturb the voltage Vs across the series resistor Rs too much. In this case, the polarity of the input current Ii has to be chosen to withdraw current from the first input of the differential amplifier 5 to obtain a voltage across the conversion resistor Rc in opposite polarity to the voltage across the series resistor Rs.

With regard to the above described two embodiments, it is also possible to exchange the position of, on the one hand, the deflection coil Lf and, on the other hand, the series resistor Rs with the thereto coupled conversion resistor Rc and differential amplifier 5. The differential amplifier 5 should than be able to withstand the flyback supply voltage Vflb.

The input current Ii through the conversion resistor Rc may be caused by an input buffer which receives an input voltage between its differential inputs and which has two outputs connected across the conversion resistor Rc for generating a differential voltage across the conversion resistor Rc. If one end of the conversion resistor Rc is connected to an output of one of the output amplifiers 1, 2, the buffer can be replaced by a differential to single converter. This differential to single converter generating a single output voltage connected to the other end of the conversion resistor Rc. Such a single output converter has a simpler construction than a buffer.

Figure 4:
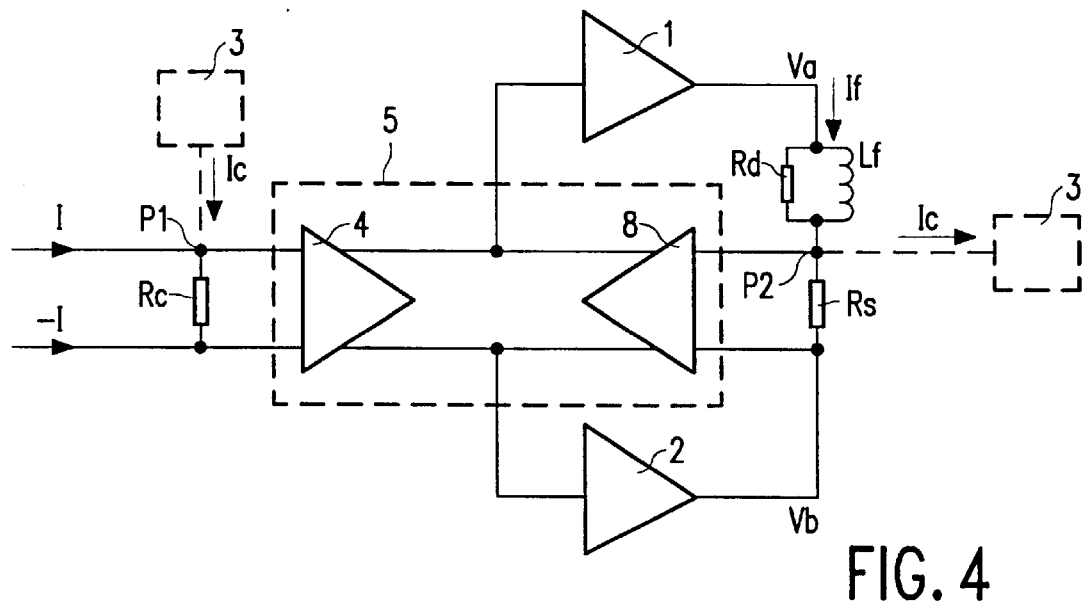
FIG. 4 shows another frame deflection circuit with the current generating circuit according to the invention.

FIG. 4 shows another frame deflection circuit with a current generating circuit 3 according to the invention. The frame deflection circuit comprises a series resistor Rs arranged in series with a frame deflection coil Lf. A connection point of the series resistor Rs and the deflection coil Lf is denoted as the second connection point P2. A damping resistor Rd is arranged in parallel with the deflection coil Lf. The frame deflection circuit further comprises an integrated power circuit which contains a first output amplifier 1, a second output amplifier 2, a first voltage-to-current converter 8 and a second voltage-to-current converter 4. The first and the second voltage-to-current converters 8, 4 constitute the drive circuit 5. The series arrangement of the deflection coil Lf and the series resistor Rs is connected between an output of the first output amplifier 1 and an output of the second output amplifier 2 to be driven in a bridge configuration for generating a deflection current If through the deflection coil Lf. The first output amplifier 1 supplies an output voltage Va, the second output amplifier supplies an output voltage Vb. Across the series resistor Rs, a voltage Vs is generated which corresponds to the sum of the deflection current If through the deflection coil Lf and the current Id through the damping resistor Rd. The voltage Vs across the series resistor Rs is sensed with the first converter 8 which has a first and a second current output. To provide a feedback, the first current output is connected to an input of a first output amplifier 1, and the second current output is connected to an input of the second output amplifier 2. The second voltage-to-current converter 4 has two inputs for receiving an input waveform occurring across an input or conversion resistor Rc. The input waveform may be generated by a buffer which supplies a current Ii through the conversion resistor Rc. The second voltage-to-current converter 4 has a first and a second current output. The first current output is connected to the input of the first output amplifier 1, and the second current output is connected to the input of the second output amplifier 2.

The first and the second voltage-to-current converters 8, 4 are identical. The current outputs of the first and the second voltage-to-current converters 8, 4, which are interconnected, supply output currents which have opposite polarities. In this way, the output voltages of the first and second output amplifiers 1, 2 will be controlled such that the voltages across the series resistor Rs and the conversion resistor Rc are substantially equal. The current generating circuit 3 may be connected to the second connection point P2 to divert current from the series resistor Rs. The current generating circuit may instead or also be connected at the first connection point P1 to one of the inputs of the second voltage-to-current converter 4.

FIGS. 5A–5F show circuit diagrams of embodiments of current generating circuits 3 according to the invention.

The embodiments shown in FIGS. 5A to 5D generate a current I which is supplied to a connection point P. This point P may be the first connection point P1 which denotes the connection point of the current generating means 3 and the conversion resistor Rc, or the second connection point P2 which denotes the connection point of the current generating means 3 and the series resistor Rs. In this case, the current I is the correction current Ic. The current I may also be supplied as the reference current Iref to input P3 of the current mirror as shown in FIG. 5E.

In the frame deflection circuit shown in FIG. 1, the current generating circuit 3 supplies a correction current Ic to the first connection point P1 to enlarge the voltage Vi across the conversion resistor Rc. If the current generating circuit 3 is connected in other ways to the conversion resistor Rc, the direction of the correction current Ic has to be selected such as to enlarge the voltage across the correction resistor Rc. If the current generating circuit 3 is connected to the second connection point P2, as shown in FIG. 1, the correction current Ic should be withdrawn from the series resistor Rs to divert the current Id flowing through the damping impedance Rd from the series resistor Rs. If the position of the deflection coil Lf and the series resistor Rs are interchanged, the correction circuit 3 which is still connected to the connection point of the deflection coil Lf and the series resistor Rs has to supply the correction current Ic to the series resistor Rs such that the current Id through the damping impedance Rd will not flow through the series resistor Rs.

In the frame deflection circuit according to FIG. 3, two possible positions of the correction circuit 3 are shown. The direction of the correction current Ic is shown with an arrow. In the same way as described in relation to FIG. 1, the current generating circuit 3 may be connected in other ways to the conversion resistor Rc or the series resistor Rs. The direction of the correction current Ic has to be selected to enlarge the voltage Vi across the conversion resistor Rc, or to prevent the current Id flowing through the damping impedance Rd to flow through the series resistor Rs.

In the frame deflection circuit according to FIG. 4, the same remarks are valid as given above in relation to FIG. 3.

FIG. 5A shows a series arrangement of a current determining resistor R1 and a semiconductor switch S. The series arrangement receives a voltage Vd and supplies a current I to the connection point P during a conduction period of the semiconductor switch S. A control input of the semiconductor switch S receives a control signal C2 from a control signal generator 7 which causes the semiconductor switch S to conduct at least during a last part of the flyback period Tf. The current I depends on the values of the voltage Vd and the current determining resistor R1. The voltage Vd has to be selected to supply the current I in the desired direction.

FIG. 5B differs from FIG. 5A in that the voltage Vd is selected to be a deflection voltage Va, Vb at the end of the deflection coil Lf not connected to the series resistor Rs. In this way the current I depends on the flyback voltage Vflb.

In FIG. 5C, the semiconductor switch S is a pnp transistor T6 which has an emitter connected to the voltage Va at the output of the output amplifier 1 via the current determining resistor R1. The base of the pnp transistor T6 is connected to a DC-voltage selected such that the pnp transistor T6 conducts during the flyback period Tf during which the deflection voltage Va is approximately equal to the high flyback supply voltage Vflb. The collector of the pnp transistor T6 supplies the current I.

FIG. 5D differs from FIG. 5C in that the pnp transistor T6 is replaced by a zener diode D1. An anode of the zener diode D1 is directed towards the connection point P if the supply voltage is the output voltage Va. It is clear that in the situation that a current I has to be withdrawn, the output voltage Va of the first output amplifier 1 has to be replaced by the output voltage Vb of the second output amplifier 2 and that the direction of the zener diode D1 has to be altered.

FIG. 5E shows a current generating circuit 3 which comprises a current mirror with a first transistor T4 and a second transistor T5, both of the npn type, and a third transistor T6 of the pnp type. A base and a collector of the first transistor T4 are interconnected. The base of the first transistor T4 is connected to a base of the second transistor T5. The emitters of the first and the second transistor T4, TS are connected to the same voltage, which, in FIG. 5E, is ground potential. A collector of the second transistor T5 is connected to the first or second connection point PI, P2 to supply the correction current Ic. An emitter of the third transistor T6 receives a reference current Iref at the connection point P3. The third transistor T6 has a base connected to the scan supply voltage Vp or any other suitable fixed voltage, and a collector connected to the collector of the first transistor T4. The current through the first transistor T4 is determined by the reference current Iref. This reference current Iref is mirrored by the first and second transistor T4, T5 to obtain the correction current Ic. It is also possible to connect the emitters of the first and second transistor T4, T5 to a suitable voltage which is lower than the scan supply voltage Vp and the voltage at the first or second connection point PI, P2, as may be the case with the output voltage Vb of the second output amplifier 2. The reference current Iref can be generated in any of the ways shown in FIGS. 5A to 5D.

FIG. 5F shows a current generating circuit 3 which comprises a series arrangement of a resistor R1 and a semiconductor switch S, whereby the series arrangement is arranged in parallel with the series resistor Rs. A control input of the semiconductor switch S receives a control signal C2 which causes the semiconductor switch S to conduct at least during a last part of the flyback period Tf.

While the invention has been described in connection with preferred embodiments, it will be understood that modifications thereof within the principles outlined above will be evident to those skilled in the art and thus the invention is not limited to the preferred embodiments but is intended to encompass such modifications.

I claim:

1. A deflection circuit for generating a deflection current through a deflection coil to deflect an electron beam in a cathode ray tube, the deflection current having a scan period and a flyback period, the deflection circuit comprising:

a series resistor arranged in series with the deflection coil for generating a feedback voltage related to the deflection current;

a damping impedance arranged in parallel with the deflection coil;

a drive circuit having an input terminal coupled to the series resistor for receiving the feedback voltage, the drive circuit being coupled to a conversion resistor for receiving an input waveform, and having an output coupled to the series arrangement of the deflection coil and the series resistor, the drive circuit generating the deflection current in response to a difference between the input waveform and the feedback voltage; and current generating means for generating a correction current within the flyback period, characterized in that the current generating means is coupled to the series resistor and/or the conversion resistor, whereby the correction current is activated during at least a last part of the flyback period to obtain a value of the correction current during said at least last part of the flyback period differing from a value of the correction current during the scan period.

2. A deflection circuit as claimed in claim 1, wherein the current generating means supplies the correction current to the conversion resistor for enlarging a current through the conversion resistor during at least the last part of the flyback period.

3. A deflection circuit as claimed in claim 1, wherein the current generating means diverts the correction current from the series resistor during at least a last part of the flyback period.

4. A deflection circuit as claimed in claim 3, wherein the current generating means comprises:

a series arrangement of a semiconductor switch and a current determining impedance coupled in parallel to the series resistor to divert the correction current from the series resistor; and a control circuit receiving information related to the flyback period and being coupled to the semiconductor switch for causing the semiconductor switch to be conductive during at least the last part of the flyback period.

5. A deflection circuit as claimed in claims 1, wherein the current generating means comprises a current mirror having an input for receiving a reference current, and an output for supplying the correction current proportional to the reference current.

6. A deflection circuit as claimed in claim 5, wherein the current generating means further comprises:

a series arrangement of a current determining impedance and a semiconductor switch coupled between a voltage source and the input of said current mirror, for generating said reference current.

7. A deflection circuit as claimed in claim 1, wherein the current generating means comprises:

a series arrangement of a current determining impedance and a semiconductor switch coupled between a voltage source and the conversion resistor or the series resistor; and a control circuit receiving timing information related to the flyback period and being coupled to the semiconductor switch for causing the semiconductor switch to be conductive during at least the last part of the flyback period.

8. A deflection circuit as claimed in claim 7, wherein the deflection circuit further comprises means for connecting a flyback supply voltage to the output of the drive circuit during the flyback period, and wherein the voltage source is constituted by a deflection voltage at an end of the deflection coil not coupled to the series resistor.

9. A deflection circuit as claimed in claim 1, wherein the deflection circuit further comprises means for connecting a flyback supply voltage to the output of the drive circuit during the flyback period, and wherein the current generating means comprises a transistor of the pnp type having a control electrode, and a main current path being arranged in series with a current determining impedance, an emitter of the transistor being coupled to an end of the deflection coil not being coupled to the series resistor via the current determining impedance, a collector of the transistor being coupled to the conversion resistor or the series resistor, whereby the control electrode receives a DC-voltage for rendering the transistor conductive during the flyback period and non conductive during the scan period.

10. A deflection circuit as claimed in claim 1, wherein the drive circuit has a further output, the series arrangement of the deflection coil and the series resistor being coupled between the output and the further output of the drive circuit, said series arrangement being driven in a bridge mode.

11. A deflection circuit as claimed in claim 1, wherein the deflection circuit further comprises means for connecting a flyback supply voltage to the output of the drive circuit during the flyback period, and wherein the current generating means comprises a zener diode arranged in series with a current determining impedance, the series arrangement of the zener diode and the current determining impedance being coupled between the end of the deflection coil not being coupled to the series resistor, and the conversion resistor or the series resistor, and whereby the zener diode is conductive during the flyback period and non-conductive during the scan period.

12. An integrated circuit for use in a deflection circuit as claimed in claim 1, whereby the integrated circuit comprises the drive circuit, and whereby the current generating means comprises a series arrangement of a current determining impedance and a semiconductor switch coupled between a voltage source and the conversion resistor or the series resistor, the integrated circuit further comprising said semiconductor switch, the semiconductor switch being conductive during at least the last part of the flyback period.

13. A picture display apparatus comprising:
   a cathode ray tube with a deflection coil; and
   a deflection circuit generating a deflection current through the deflection coil for deflecting an electron beam in the cathode ray tube, the deflection current having a scan period and a flyback period, wherein the deflection circuit comprising:
   a series resistor arranged in series with the deflection coil for generating a feedback voltage related to the deflection current;
   a damping impedance arranged in parallel with the deflection coil;
   a drive circuit having an input terminal coupled to the series resistor for receiving the feedback voltage, the drive circuit being coupled to a conversion resistor for receiving an input waveform, and having an output coupled to the series arrangement of the deflection coil and the series resistor, the drive circuit generating the deflection current in response to a difference between the input waveform and the feedback voltage; and
   current generating means for generating a correction current within the flyback period,
characterized in that the current generating means is coupled to the series resistor and/or the conversion resistor, whereby the correction current is activated during at least a last part of the flyback period to obtain a value of the correction current during said at least last part of the flyback period differing from a value of the correction current during the scan period.

14. A deflection circuit for generating a deflection current through a deflection coil to deflect an electron beam in a cathode ray tube, the deflection current having a scan period and a flyback period, the deflection circuit comprising:
   a series resistor arranged in series with the deflection coil for generating a feedback voltage related to the deflection current;
   a damping impedance arranged in parallel with the deflection coil;
   a drive circuit having an input terminal coupled to the series resistor for receiving the feedback voltage, the drive circuit further being coupled to a conversion resistor for receiving an input waveform, and having an output coupled to the series arrangement of the deflection coil and the series resistor, the drive circuit generating the deflection current in response to a difference between the input waveform and the feedback voltage; and
   current generating means coupled to the series resistor and/or the conversion resistor, said current generating means comprising a semiconductor switch being activated during at least a last part of the flyback period for generating a correction current having a value during said at least last part of the flyback period differing from a value of the correction current during the scan period.

* * * * *